Nov. 12, 1963  J. SIMPSON  3,110,247
SIDE SEAM INDEXING DEVICE FOR CANS
Filed Aug. 22, 1961  4 Sheets-Sheet 1

INVENTOR
JUSTIN SIMPSON

BY
Mason, Porter, Diller & Stewart
ATTORNEYS

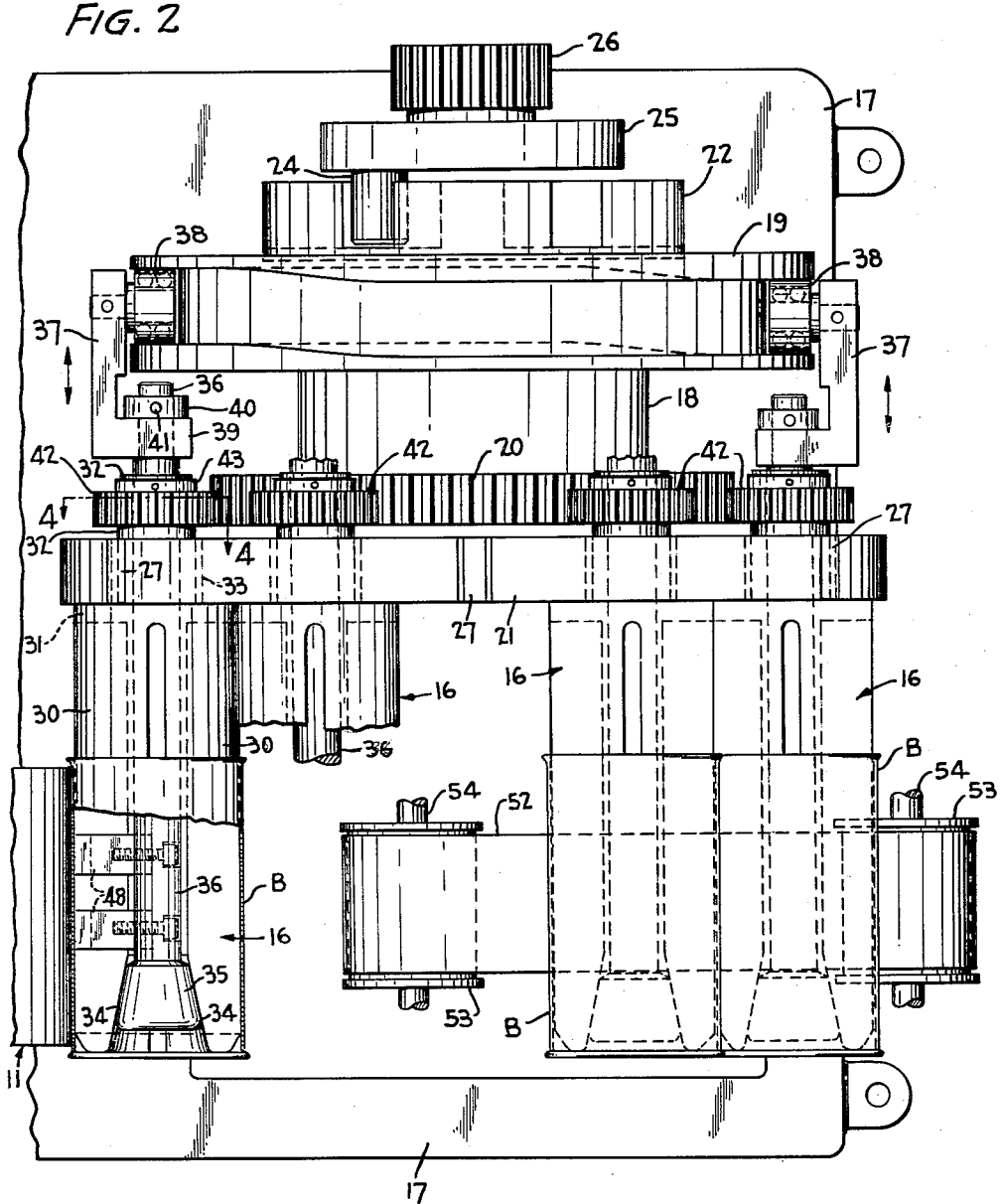

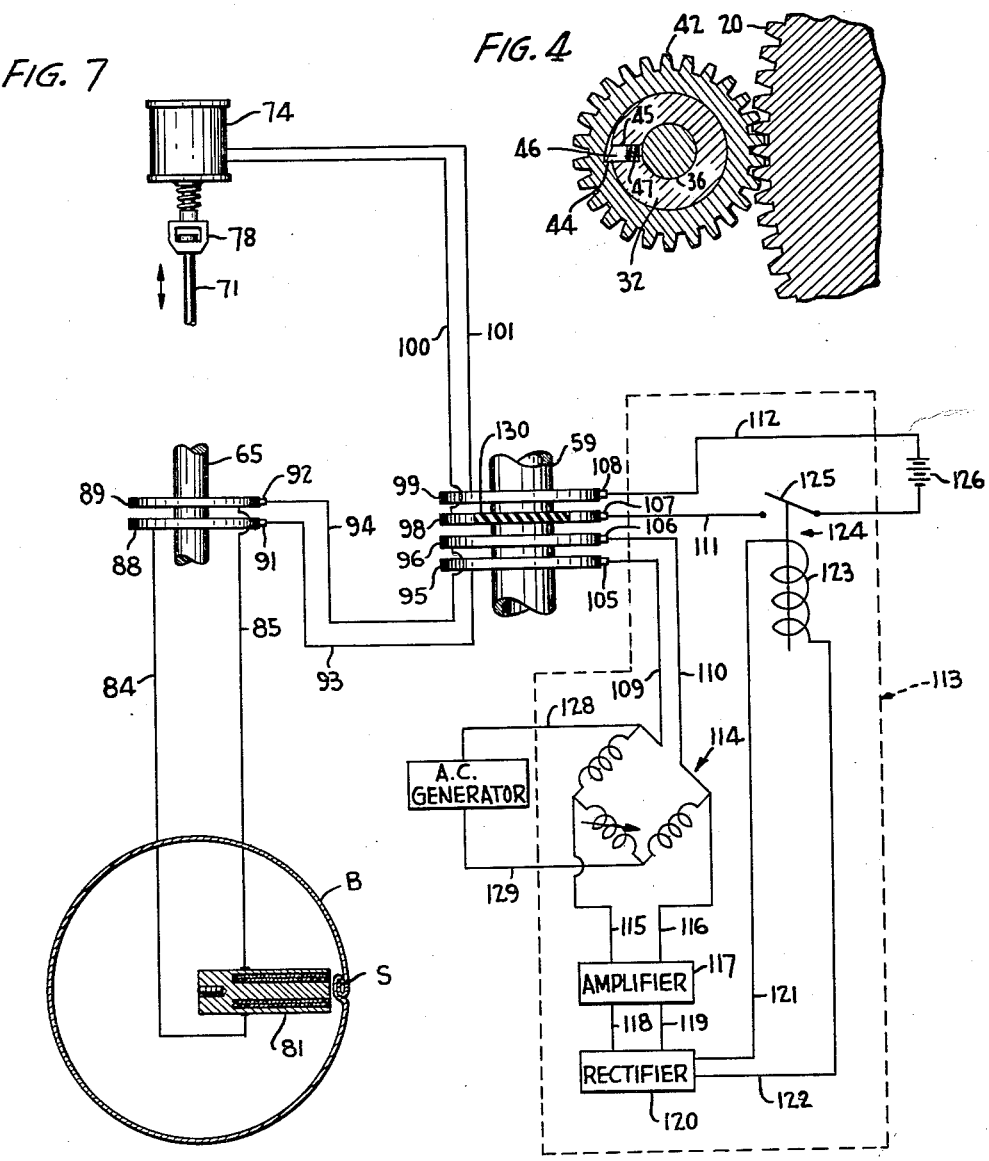

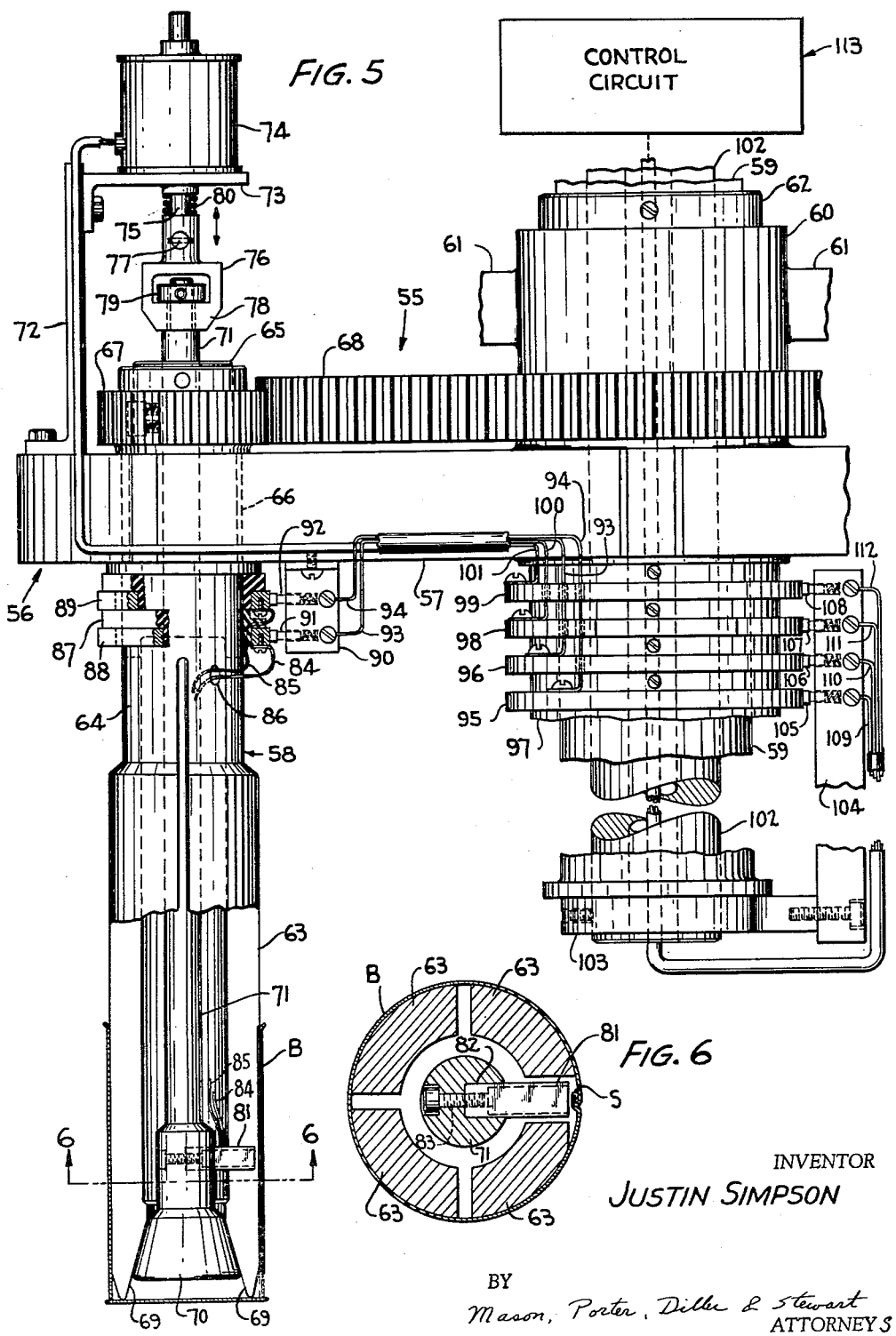

United States Patent Office 3,110,247
Patented Nov. 12, 1963

3,110,247
SIDE SEAM INDEXING DEVICE FOR CANS
Justin Simpson, Elmhurst, Ill., assignor to Continental Can Company, Inc., New York, N.Y., a corporation of New York
Filed Aug. 22, 1961, Ser. No. 133,110
19 Claims. (Cl. 101—38)

This invention relates in general to new and useful improvements in can handling means, and more specifically to a novel side seam indexing device for cans and can bodies, it being understood that the term "can body" refers to the body of a can before an end closure has been applied, whereas the term "can" refers to a can body on which one end closure has been applied.

This invention particularly relates to the indexing of cans or can bodies having a side seam for the purpose of properly aligning the can bodies with respect to a printing machine whereby printed matter on the can body will be properly oriented with respect to the side seam thereof.

It has been the usual practice in fabricating decorated cans to apply the necessary decoration and printed matter to large flat sheets of thin tin plate from which the individual can body blanks are subsequently cut. The can body blanks are then formed into can bodies in the conventional manner, wherein the can body blanks are formed into cylindrical shape, side seam hooks formed and engaged, the hooks bumped together and the side seams soldered. It is necessary for the soldering of high strength cans such as cans for beer that the side seam of each can be free of the printed material or decoration. Also, most of the printing materials used are at least partially deteriorated by the temperature necessary at the side seam to effectively solder the seam. As a consequence, a can having an undecorated strip of tin plate with the side seam of the can body being located within this strip has, until the present invention, been by far the most common type of printed, high strength, soldered side seam can produced. The existence of this undecorated strip obviously detracts from the appearance of the can to a great extent, and there has been a long-sought goal in the can making industry to be able to produce competitive fully decorated high strength cans having side seams.

Printing machines have been devised for continuously printing and decorating seamless can bodies. However, these machines have not been usable in conjunction with can bodies having side seams because of the lack of suitable indexing means for indexing the side seams with respect to the printed and decorative matter applied to the can bodies. Accordingly, it is a primary object of this invention to provide a novel indexing device for indexing the side seams of can bodies whereby can bodies, properly indexed, may be presented to a printing drum of a printing machine for the purpose of having printing and decorative matter applied continuously around the can body from one side of the side seam thereof to the opposite side of the side seam.

In the use of printing machines, the can bodies are placed on suitable mandrels, which mandrels are free to rotate during the printing operation wherein a drum of the printing machine engages the exterior surface of the can body for transferring printing materials thereto. These mandrels are of the expansible type and will firmly grip the can bodies when expanded. This invention has as another object the provision of means on the expansible mandrels of the type referred to above for detecting the side seam of can bodies and for expanding the mandrels when the side seams of the can bodies are in a particular oriented position with respect to the mandrels so as to index the side seams of can bodies carried by the mandrels.

Another object of this invention is to provide a novel can body positioning device which includes an indexable turret having one or more mandrels projecting therefrom, the mandrels being mounted for rotation about their axes and there being provided means for rotating the mandrels as the turret is moved from one station to another in the indexing thereof, there additionally being provided means for engaging a can body loosely carried by a mandrel for preventing the rotation of the can body while the mandrel carrying the can body rotates until the mandrel and the can body are in a particular relative position with respect to one another, after which means are provided for expanding the mandrel while the can body is in this particular relationship with respect to the mandrel to maintain the can body on the mandrel.

A further object of this invention is to provide novel means for holding a can body against rotation while the can body is carried by a mandrel which is rotating about its axis and is being simultaneously indexed by the rotation of a turret carrying the same, the means for holding the can body against rotation being in the form of an endless belt having a run engageable by the can body, the endless belt being mounted for freedom of movement about supporting pulleys.

A further object of this invention is to provide a novel side seam indexing device for cans and can bodies of the type having internal side seams, the device including a turret having rotatable mandrels carried thereby for movement therewith, and each of the mandrels being provided with a radially projecting dog which is engageable behind the side seam of the can body to index the side seam of the can body with respect to the mandrel.

A still further object of this invention is to provide a novel means for indexing can bodies on mandrels of the type which rotate, the means including a sensing device carried by the mandrel for sensing the internal side seam of a can body, a friction belt for engaging the exterior of the can body to prevent rotation thereof with the mandrel, and an electrical control system for expanding the mandrel, the electrical control system being operative in response to actuation of the sensing device due to the presence of a side seam whereby as the side seam is sensed by the sensing device, the mandrel is automatically expanded to clamp the can body thereon in fixed position so as to index the can body with respect to the mandrel.

With the above and other objects in view that will hereinafter appear, the nature of the invention will be more clearly understood by reference to the following detailed description, the appended claims and the several views illustrated in the accompanying drawings.

In the drawings:

FIGURE 2 is a plan view of the printing machine of FIGURE 1 with upper ones of the mandrels broken away in order to show the arrangement of the various mandrels carried by the turret.

FIGURE 4 is an enlarged fragmentary vertical sectional view taken along the line 4—4 of FIGURE 2, and shows the specific details of the means for rotating one of the mandrels as well as for permitting the mandrel to be freely rotated during engagement of a can body by the printing drum.

FIGURE 5 is a fragmentary plan view of a modified form of can body positioning device utilizing an electrical control system for indexing can bodies with respect to a mandrel.

FIGURE 6 is an enlarged fragmentary vertical sectional view taken along the line 6—6 of FIGURE 5, and shows the details of a sensing device carried by the mandrel for sensing the side seam of a can body.

FIGURE 7 is a schematic view showing the details of the electrical circuit for operating the electrically controlled form of the invention.

Figure 1:
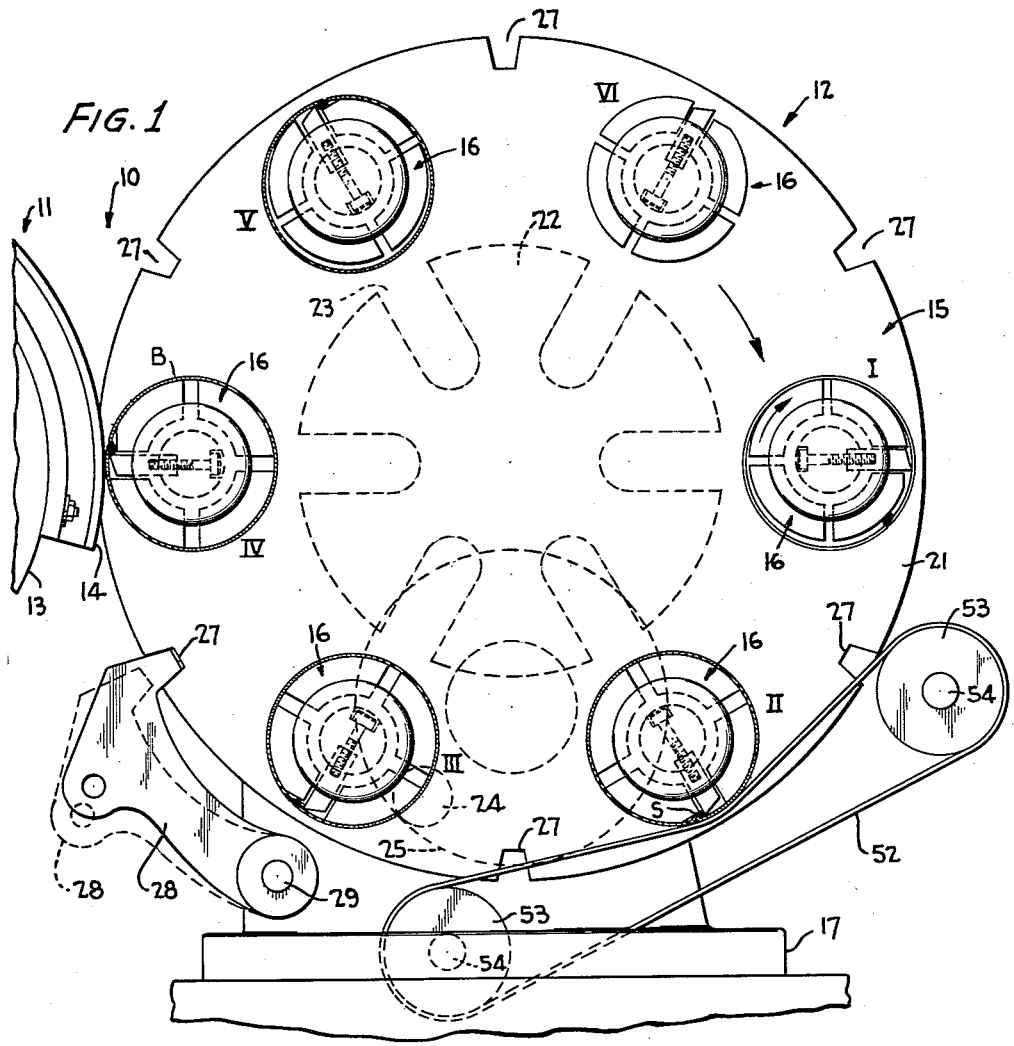
FIGURE 1 is a fragmentary elevational view of a printing machine having associated therewith means for positioning can bodies in indexed relation with respect to the printing drum thereof.

Referring now to the drawings in detail, it will be seen that there is illustrated in FIGURES 1 and 2 portions of a machine for printing indicia and decorations on cans and can bodies, the machine being generally referred to by the numeral 10. The machine 10 includes a printing machine, generally referred to by the numeral 11, of which only a small portion is shown. The printing machine 11 is a conventional printing machine and in itself does not form part of this invention. The machine 10 also includes a can positioning device, generally referred to by the numeral 12, associated with the printing machine 11 for presenting cans and can bodies in indexed positions with respect to the printing machine 11.

The only portion of the printing machine 11 illustrated in the drawings is a printing drum 13 having a plate portion 14. The printing drum 13 may be of any type, although in the embodiment of the invention actually in use, the printing machine 11 is of the offset type and the drum 13 has a resilient plate 14 to which the printing materials are transferred for further transferral to can bodies and cans.

The can body positioning device 12 includes a turret 15 which lies in a vertical plane for rotation about a horizontal axis. The turret 15 carries a plurality of identical mandrels, generally referred to by the numeral 16, each mandrel 16 being mounted for rotation about its axis. The turret 15 is carried by a suitable support 17 which is a part of the total machine 10.

The turret 15 includes, as is best shown in FIGURE 2, a bearing assembly 18 which is suitably carried by the support 17. A cam track unit 19 is rigidly secured to one end of the bearing assembly 18, and a fixed ring gear 20 is rigidly secured to the opposite end of the bearing assembly 18. A shaft (not shown) extends through the bearing unit 18 and is rotatably journaled therein in a suitable manner. The shaft carries a turret plate 21 which, in turn, carries the mandrels 16. The opposite end of the shaft for the turret plate 21 has a Geneva drive wheel 22 secured thereto. The outline of this drive wheel, which is conventional, is best shown in FIGURE 1. The Geneva drive wheel 22 has a plurality of radial slots 23 formed therein in accordance with the mandrels 16. The remainder of the Geneva drive includes a drive pin 24 which is sequentially engageable in the slots 23 of the Geneva drive plate 22 for rotating and indexing the turret plate 21. The pin 24 is carried by a plate 25 in eccentric relation with the shaft 25 being driven by means of a gear 26. The specific means for mounting the plate 25 and the gear 26 have not been illustrated. However, these are conventional and do not form a part of the invention per se. It is also to be understood that the plate 25 is to be driven in timed relation with the drum 13 of the printing machine 11 so that the positioning of can bodies or cans B, with respect to the drum 13 will be synchronized. It is to be understood that with a Geneva drive, the drive pin is rotated at a constant speed and in this manner, the turret plate is shifted from station to station at evenly spaced time intervals to effect the indexing thereof. In order to maintain the indexed position of the turret plate 21, the turret plate 21 has a plurality of notches 27 formed in the periphery thereof, the notches 27 corresponding in number to the mandrels 16. A pivotally mounted dog 28 is suitably carried by the support 17 on a pivot pin 29 for engagement in the notches 27. The specific details of the dog and the means for operating the same are conventional and therefore are not illustrated here. However, for example, the dog 28 may be spring urged to ride along the surface of the turret plate 21 and to automatically fall in the notches 27. The dog 28 may then be retracted by suitable mechanism in timed relation to the rotation of the pin 24.

Each of the mandrels 16 is of the expanding type and includes a plurality of segmental fingers 30 carried by a base portion 31 which, in turn, has a shaft 32 secured thereto. The shaft 32 extends through the turret plate 21 and is suitably rotatably journaled in bearings 33 carried thereby. Each of the fingers 30 has a tapered surface 34 which is engaged by a conical expander 35 secured to the end of a shaft 36. The shaft 32 has a bore therethrough through which the shaft 36 is slidably mounted.

For each of the mandrels 16 there is a bracket 37 which carries a cam follower 38 engaged in the cam track 19 to effect forward and rearward reciprocation of the bracket 37. The rear end of the respective rod 36 is reduced in diameter and is rotatably journaled in a transverse arm 39 of the bracket 37 for forward and rearward movement thereby. A collar 40 is secured on the rear end of the rod 36 by a pin 41, which collar 40 engages the rear surface of the arm 39.

It is desired that all of the mandrels 16 rotate as the mandrels are being indexed from one station to another. It is also desired that this rotation be a 360 degree rotation. To this end, there is mounted on the rear end of the shaft 32 of each mandrel 16 a gear 42 which is meshed with the ring gear 20. The gear 42 is held in place by means of a collar 43 which is secured to the rear end of the shaft 32.

Reference is now made to FIGURE 4 in particular, wherein it is shown that the gear 42 has a one-way drive connection with its respective shaft 32. The inner surface of the gear 42 is recessed to define a shoulder 44 and the shaft 32 has a radial slot 45 in which there is positioned a dog 46 which is urged outwardly by means of a spring 47. It will be readily apparent that when the gear 42 is rotated in a clockwise direction, as occurs in the indexing of the turret plate 21, the gear 42 will serve to drive the shaft 32 so as to effect the rotation of the associated mandrel 16. On the other hand, when it is desired to freely rotate the mandrel 16, as will occur in a printing operation, the mandrel 16 is free to rotate in a clockwise direction while the gear 42 remains stationary, as it does when the turret plate 21 is stationary after the indexing thereof.

Attention is directed to FIGURE 1, wherein it is indicated that the turret 15 has six different stations, the various stations being indicated by Roman numerals. At station I, can bodies or cans are positioned onto the mandrels. As the turret 15 is indexed with each mandrel advancing from one station to another, each mandrel is rotated 360 degrees due to the meshing of the individual mandrel gears 42 with the ring gear 20. At station IV, the mandrel is aligned with the printing drum or cylinder 13 and a can or can body B carried thereby is in position for engagement with the printing plate 14. Due to the connection between the mandrel shaft 32 and the gear 42, it will be seen that although the mandrel is not being rotated by means of the gears 20 and 42 when the turret 15 is in an indexed position, the engagement between the printing plate 14 and the can or can body B will permit the rotation of the mandrel 16 at station IV, as is necessary for the effective transfer of printing material from the plate 14 to the can B. At this time, it is pointed out that the cam track 19 is so designed that the mandrels 16 are expanded between stations II and III with the expansion of the mandrel taking place closer to station II than to station III. Immediately after each mandrel 16 begins to be indexed from station V to station VI, the mandrel is contracted and remains contracted until the mandrel passes station II. The can or can body B is removed from the mandrel 16 at station VI.

Figure 3:
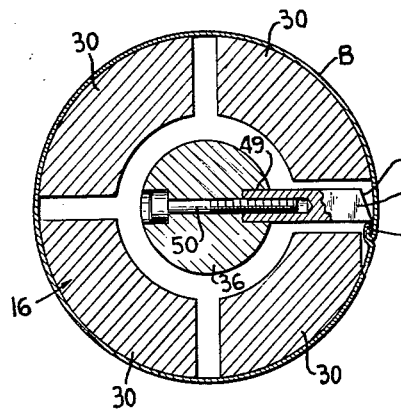
FIGURE 3 is an enlarged vertical sectional view taken through one of the mandrels and shows the means carried thereby for indexing a can body with side seam thereon.

Should the can or can body be seamless, there will be no indexing problem. However, when the can or can body is provided with a side seam, it is necessary that the side seam be indexed with respect to the plate 14 of the printing drum or cylinder 13 so that the printing may begin immediately to one side of the side seam and discontinue closely adjacent the opposite side of the side seam, or if desired, when background printing is applied simultaneously with other decorative printing and indicia, the background printing must be aligned with the side seam. To this end, each mandrel 16 is provided with indexing means which includes a fixed dog 48 carried by the associated rod 36 of the mandrel. It is to be noted that the dog 48 extends in alignment with the openings between two adjacent fingers 39 of the mandrel 16 and portions of the fingers are removed in the vicinity of the dog 48. The rear portion of the dog 48 is seated in a socket 49 formed in the rod 36. The dog 48 is held in the socket 49 by means of a fastener 50. It is to be noted that the dog 48 has a sloping outer surface 51 so as to eliminate drag between the dog 48 and the inner surface of the can or can body B. Although only one dog 48 is shown in FIGURE 3, in practice, two dogs 48 will be provided on each mandrel 16, as is shown in FIGURE 2.

It is not sufficient to provide the mandrel 16 with dogs 48 to effect the orientation or indexing of the can or can bodies with respect to the mandrels 16. When the can bodies are positioned on the contracted mandrels 16, the frictional contacts between the can bodies and the mandrels 16 are generally sufficient to result in the rotation of the can bodies with the mandrels. As a result, the initial relative positions of the mandrels and the cans do not materially change as the mandrels rotate. To permit the holding of the cans or can bodies as the mandrels rotate, there has been provided an endless friction belt 52. The friction belt 52 is carried by a pair of pulleys 53 which are provided with shafts 54 suitably carried in any desired manner by the support 17. The relative position of the endless belt 52 with respect to the paths of the mandrels 16 and the cans or can bodies carried thereby is such that the cans or can bodies will engage the friction belt 52 as the cans or can bodies pass between station I and station II and will continue into engagement with the cans or can bodies until they have passed station II. The friction belt 52 is free to move with that portion of the can or can body engaged therewith. As a result, there is no rotation of the cans or can bodies as the mandrels 16 rotate therewithin. The relative rotation of the mandrels 16 with respect to the associated can or can body continues until such time as the point of the dog or dogs 48 engage a side seam S of the can or can body in the manner shown in FIGURE 3. Then, the friction between the friction belt 52 and the can or can body is insufficient to hold the can or can body against rotation and the same rotates with the mandrel 16. Thus, the desired indexing of the can or can body with respect to each mandrel 16 is accomplished. While the can or can body is still engaged with the friction belt 52 and is positioned by the dog or dogs 48, the mandrel 16 is expanded to lock the can or can body thereon in the indexed position. The can or can body is now properly indexed for engagement with the plate 14 of the printing drum 13 of the printing mechanism 11.

Reference is now made to FIGURES 5, 6 and 7, wherein there are illustrated portions of a modified form of can positioning device, generally referred to by the numeral 55. The can positioning device 55 includes a turret, generally referred to by the numeral 56, the turret 56 corresponding to the turret 15. The turret 56 includes a turret plate 57 having a plurality of mandrels projecting therefrom, each mandrel being generally referred to by the numeral 58. Although only one mandrel 58 has been illustrated, it is to be understood that the turret plate 57 will carry six mandrels 58, like the six mandrels 16 carried by the turret plate 21. The turret plate 57 is carried by a shaft 59 which is rotatably journaled in a suitable bearing assembly 60 carried by supports 61 forming parts of the support 17. The shaft 59 is positioned relative to the bearing assembly 60 by means of a collar 62. The rear end of the shaft 59 has been omitted, but it is to be understood that it is to be driven by means of a Geneva drive of the same type illustrated in FIGURE 2 and described hereinabove.

Each mandrel 58 is of the expanding type and is formed of a plurality of circumferentially spaced fingers 63 with the arrangement of the fingers being shown in FIGURE 6. The rear portions of the fingers 63 are reduced, as at 64, and the fingers 63 are connected together at the rear ends thereof in a solid shaft 65 which extends through the turret plate 57 and is suitably rotatably journaled therein by means of bearings 66. A gear 67 is mounted on the rear part of the shaft 65 in the same manner as are the gears 42 on the shafts 32. Each gear 67 meshes with a fixed ring gear 68 carried by the bearing assembly 60.

In order to expand the fingers 63, as is necessary to clamp a can or can body B onto the end of the mandrel 58, the ends of the fingers 63 are provided with tapered surfaces 69 which are engaged by a conical head 70 on an elongated rod 71. The rod 71 extends entirely through the shaft 65, as is best shown in FIGURE 5.

A mounting bracket 72 extends rearwardly from the rear surface of the turret plate 57 for each of the mandrels 58. A second mounting bracket 73 is secured to each of the mounting brackets 72 and supports an electromagnetic device 74 which includes a reciprocating rod 75. The rod 75 has a connector 76 secured thereto by means of a pin 77. The connector 76 includes a forward portion 78 in which the rear end of the shaft 71 is rotatably journaled. A collar 79 is secured on the rear end of the shaft 71 within the general confines of the connector 76 so as to secure the rod 71 to the connector 76 for movement therewith, but for relative rotation between the two. The electromagnetic actuator 74 serves to move the rod 71 rearwardly to effect the expansion of the fingers 63. The rod 71 is moved to a forward position by a coil spring 80 disposed about the rod 75.

As is best shown in FIGURES 5 and 6, the portion of the rod 71 which is associated with a can or can body B is provided with at least one sensing device 81 of known type for sensing the existence of the seam S of a can or can body B. Reference is here made to U.S. Patent No. 2,935,680 to Gordon H. Bendix, et al., which discloses a typical sensing device of the type utilized in this invention. The rod 71 is provided with a recess 82 in which one end of the sensing device 81 is seated. The sensing device 81 is secured to the rod 71 by means of a bolt 83.

A pair of wires 84, 85 extend from the sensing device 81 through the mandrel 58 and out through an opening 86 in the rear portion of one of the fingers 63. An insulated ring 87 is carried by the shaft 65 just forwardly of the turret plate 57. The insulated ring 87 carries two contact rings 88, 89 to which the lead wires 84, 85 from the sensing device 81 are respectively connected.

An insulated contact bracket 90 projects forwardly from the front face of the turret plate 57. The contact bracket 90 carries a pair of brushes 91, 92 engaged with the contact rings 88, 89. The brushes 91, 92 are spring urged and have electrically connected thereto wires 93, 94 which lead to two contact rings 95, 96, respectively, the contact rings 95, 96 being mounted in insulated relation on a forward portion of the shaft 59 by means of an insulated sleeve 97 disposed immediately forward of the turret plate 57. The sleeve 97 also carries contact rings 98 and 99 to which wires 100 and 101, respectively, are connected. The wires 100 and 101 lead to the electromagnetic actuator 74.

The shaft 59 is tubular and a fixed shaft 102 extends therethrough. The shaft 102 extends beyond the forward end of a shaft 59 and has a bracket 103 rigidly secured thereto. The insulated bracket 104 is, in turn, rigidly secured to the bracket 103. The insulated bracket 104 carries brushes 105, 106, 107 and 108 which are engaged with the contact rings 95, 96, 98 and 99, respectively. The brushes are spring loaded into engagement with their respective contact rings at all times and have connected thereto wires 109, 110, 111 and 112 which lead to a control circuit, generally referred to by the numeral 113. The last four mentioned wires extend through the shaft 102 which is also of a tubular construction.

Reference is now made to FIGURE 7 wherein the complete wiring diagram for the mandrel arrangement of FIGURE 5 is illustrated. While the control 113 may be of any type, a workable form of control is illustrated. The control is of the type utilizing an electrical bridge, generally referred to by the numeral 114 which has connected to one side thereof the sensing device 81 through the wires 109, 110. The bridge 114 is connected by means of wires 115, 116 to an amplifier 117 which, in turn, is connected by wires 118, 119 to a rectifier 120. The rectifier 120 has wires 121, 122 leading therefrom and connected to a coil 123 of a control relay 124 which includes a switch element 125 in the wire 111. The wires 111, 112 are connected to a power source 126 which is illustrated for purposes of convenience as being in the form of a battery. Another power source 127, which is an alternating current generator, is connected by means of wires 128, 129 to the bridge 114.

It should be understood without a detailed description of the wiring diagram of FIGURE 7 that when the known type of sensing device 81 senses the seam S of a can or can body B, the control circuit will be operated to close the relay 124 and thus complete the circuit to the electromagnetic actuator 74 which, in turn, will expand the mandrel 58 and clamp the can or can body B thereon in an indexed position.

In order that the electromagnetic actuator 74 may not be actuated prematurely when a can body is being placed on the mandrel 58 and to permit the automatic de-energization of the electromagnetic actuator 74 whereby the can body may be removed from the mandrel 58, the contact ring 98 is provided with an insulated section 130 the extent of which corresponds from a position slightly beyond station V, as shown in FIGURE 1 of the drawings, to a position slightly beyond station II of the turret, as shown in FIGURE 1 of the drawings.

At this time, it is pointed out that in order that the can or can body B may remain stationary to permit the relative movement of the mandrel 58 relative thereto and the sensing of the side seam S by the sensing device 81, suitable can holding means will be provided, the can holding means preferably being in the form of a friction belt like the friction belt 52 of FIGURE 1. However, for convenience purposes, the friction belt has not been illustrated in FIGURE 5.

At this time, it is pointed out that the mandrels 16 and 58 differ in minor structural details, particularly as to length and the fact that the mandrel 58 is of a reduced cross-section adjacent the turret plate 57. It is, however, pointed out that the mandrels 16 may be made identical to the mandrels 58 of it is so desired. Of course, the electrical control means will not be utilized in conjunction with the mandrel 16 when the dogs 48 are utilized.

It is also pointed out that the wiring diagram illustrated in FIGURE 7 is for one mandrel only. All of the wiring diagram illustrated in FIGURE 7 must be repeated for each mandrel of the turret 56.

It will be readily apparent that both of the can indexing means will function equally as well to properly index a can or can body with respect to an associated mandrel, as is required in conjunction with printing when the can or can body is of the type having a side seam.

From the foregoing, it will be seen that novel and advantageous provision has been made for carrying out the desired end. However, attention is again directed to the fact that variations may be made in the example apparatus disclosed herein without departing from the spirit and scope of the invention, as defined in the appended claims.

I claim:
1. A can body handling device for use with printing machines and like machines requiring the indexing of can bodies having side seams, said can body handling device comprising a movable support, at least one can body receiving expansible mandrel carried by said movable support, said mandrel being of the expanding type for clamping a can body thereon, means connected to said mandrel for rotating said mandrel about the axis thereof in timed relation to the movement of said movable support, means adjacent the path of said mandrel for engaging a can body carried by said mandrel to prevent rotation of the can body with said mandrel, a can body side seam detecting member carried by said mandrel, and means connected to said mandrel for expanding said mandrel at such time as a can body side seam is aligned with said detecting device to clamp the can body on said mandrel in an indexed position.

2. The device of claim 1 wherein said means for preventing the rotation of can bodies is in the form of an endless belt having a run freely mounted for movement alongside said movable support.

3. The device of claim 1 wherein said seam detecting member is in the form of a radial projection on said mandrel engageable behind a can body seam and adapted to serve to couple a can body to said mandrel for rotation therewith.

4. The device of claim 1 wherein said means for expanding said mandrel includes a cam track and follower whereby said mandrel is expanded at a fixed point along the path of movement thereof.

5. The device of claim 1 wherein said seam detecting member is in the form of a radial projection on said mandrel engageable behind a can body seam and adapted to serve to couple a can body to said mandrel for rotation therewith, and said means for expanding said mandrel includes a cam track and follower whereby said mandrel is expanded at a fixed point along the path of movement thereof.

6. The device of claim 1 wherein said seam detecting member is in the form of an electric sensing device.

7. The device of claim 1 wherein said means for expanding said mandrel is coupled to said seam detecting member for actuation thereby.

8. The device of claim 1 wherein said seam detecting member is in the form of an electric sensing device, and said means for expanding said mandrel is coupled to and controlled by said electric sensing device.

9. A can body handling device for use with printing machines and like machines requiring the indexing of can bodies having side seams, said can body handling device comprising a rotatable turret, at least one can body receiving expansible mandrel carried by said turret for rotation therewith, means connected to said turret for indexing said turret and simultaneously rotating said mandrel about the axis thereof during the indexing of said turret, means adjacent the path of said mandrel for engaging a can body carried by said mandrel to prevent rotation of the can body with said mandrel, a can body side seam detecting member carried by said mandrel, and means connected to said mandrel for expanding said mandrel at such time as a can body side seam is aligned with said detecting device to clamp the can body on said mandrel in an indexed position.

10. The device of claim 9 wherein said means for preventing the rotation of can bodies is in the form of an endless belt having a run freely mounted for movement alongside said turret.

11. The device of claim 9 wherein said seam detecting member is in the form of a radial projection on said mandrel engageable behind a can body seam and adapted to serve to couple a can body to said mandrel for rotation therewith.

12. The device of claim 9 wherein said means for expanding said mandrel includes a fixed cam track, an operating rod connected to said mandrel, and a cam follower on said operating rod engaged with said cam track.

13. The device of claim 9 wherein said seam detecting member is in the form of an electric sensing device.

14. The device of claim 9 wherein said means for expanding said mandrel is coupled to said seam detecting member for actuation thereby.

15. The device of claim 9 wherein said seam detecting member is in the form of an electric sensing device, said means for expanding said mandrel including an operating rod, an electromagnetic type actuator coupled to said operating rod, and an electric circuit controlled by said sensing device and coupled to said electromagnetic type actuator for operating the same.

16. The device of claim 9 wherein the means for rotating said mandrel includes a fixed gear centered on the axis of rotation of said turret and a meshing gear carried by said mandrel, and a one-way drive coupling between said meshing gear and said mandrel, whereby said mandrel may be freely rotated in an indexed position thereof.

17. The device of claim 9 together with means for rendering said mandrel expanding means inoperable throughout a predetermined arc of rotation of said turret by said mandrel.

18. The device of claim 9 wherein said seam detecting member is in the form of an electric sensing device, said means for expanding said mandrel including an operating rod, an electromagnetic type actuator coupled to said operating rod, and an electric circuit controlled by said sensing device and coupled to said electromagnetic type actuator for operating the same, said electric circuit including means for keeping said circuit open throughout a predetermined arc of rotation of said turret by said mandrel.

19. In combination with a can body printing machine of the type having a rotary printing drum, a mechanism for presenting can bodies of the type having side seams to said printing drum with the can body side seams in a predetermined indexed relation, said mechanism including a rotatable turret, at least one can body receiving expansible mandrel carried by said turret for rotation therewith, drive means for indexing said turret in timed relation to the operation of said printing machine and simultaneously rotating said mandrel about the axis thereof during the indexing of said turret, means adjacent the path of said mandrel for engaging a can body carried by said mandrel to prevent rotation of the can body with said mandrel, a can body side seam detecting member carried by said mandrel, and means connected to said mandrel for expanding said mandrel at such time as a can body side seam is aligned with said detecting device to clamp the can body on said mandrel in an indexed position.

References Cited in the file of this patent

UNITED STATES PATENTS 1,990,498 Nordquist _____ Feb. 12, 1935